US 6,644,134 B2

(12) United States Patent
Laidlaw et al.

(10) Patent No.: US 6,644,134 B2
(45) Date of Patent: Nov. 11, 2003

(54) FLUX BRUSH TORQUE SENSOR

(75) Inventors: John F. Laidlaw, Dearborn, MI (US); Stephen T. Hung, Grosse Pointe Park, MI (US); Bruce A. Bowling, Redford, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/080,265

(22) Filed: Feb. 21, 2002

(65) Prior Publication Data

US 2003/0154800 A1 Aug. 21, 2003

(51) Int. Cl.[7] ................................................. G01L 3/02
(52) U.S. Cl. ................................................. 73/862.331
(58) Field of Search .................. 73/862.331, 862.332, 73/862.333, 862.334, 862.335

(56) References Cited

U.S. PATENT DOCUMENTS

| 4,996,890 A | * | 3/1991 | Taniguchi et al. ..... 73/862.331 |
| 5,029,659 A | * | 7/1991 | Saito ..................... 73/862.322 |
| 5,046,372 A | * | 9/1991 | Taniguchi et al. ..... 73/862.335 |
| 5,297,044 A | * | 3/1994 | Sakaki et al. ................. 702/43 |
| 5,706,572 A | * | 1/1998 | Garshelis ....................... 73/335 |
| 5,811,695 A | * | 9/1998 | Satoh et al. ........... 73/862.331 |
| 6,260,422 B1 | * | 7/2001 | Odachi et al. ......... 73/862.334 |
| 6,439,066 B1 | * | 8/2002 | Norton .................. 73/862.333 |
| 2002/0189371 A1 | * | 12/2002 | Nakane et al. ......... 73/862.333 |

* cited by examiner

*Primary Examiner*—Max Noori
(74) *Attorney, Agent, or Firm*—Brinks Hofer Gilson & Lione

(57) ABSTRACT

A torque sensing device includes a housing, an input shaft, and a pinion shaft. A torsion bar interconnects and allows rotation of the shafts relative to one another. The shafts are supported to allow axial movement within the housing. A plurality of magnets are spaced radially about the input shaft, and a stator assembly mounted to the pinion shaft extend axially over the magnets. A pair of flux rings is supported by the housing and extend annularly around the stator assembly at a radial distance from the stator assembly. Each one of a pair of flux brushes is magnetically proximal to one of the flux rings. The flux brushes are spaced apart from one another by a gap. A pair of sensors within the gap measures the direction and magnitude of a magnetic flux passing between the flux brushes.

16 Claims, 7 Drawing Sheets

FLUX BRUSH TORQUE SENSOR

FIELD OF INVENTION

The invention relates to a sensor adapted to measure the torque between two rotatable shafts. Specifically, the present invention relates to a device that measures the torque between an input shaft connected to a steering wheel and a pinion shaft connected to a steering rack of an automobile.

BACKGROUND OF THE INVENTION

A large number of automobiles are equipped with power steering. The most common power steering system presently is a hydraulic power steering system. The steering mechanism of a vehicle includes an input shaft which is connected to the steering wheel of the vehicle. Further, a pinion shaft is mechanically linked to the wheels of the vehicle such that rotation of the pinion shaft provides steering to the vehicle. The input shaft and the output shaft are coupled by a torsion bar. In a hydraulic power steering system, a pump provides pressurized hydraulic fluid to provide force to assist rotation of the pinion shaft. The power assist provided by the hydraulic fluid is controlled by rotational deflection of the torsion bar that interconnects the input shaft and the pinion shaft. As the amount of torque between the two shafts increases, the power steering system provides more force to assist in rotation of the pinion shaft. In this way, the amount of torque that the operator of the vehicle must input to the system is controlled.

Unfortunately, hydraulic power steering systems are inefficient, primarily due to the need to size components needed to respond to steering demands through a broad range of operating conditions. In response to the challenge of providing more energy efficient steering systems, electric power assisted steering systems have been developed. In an electric power assisted system, an electric motor provides force to a steering rack of the vehicle to assist in turning the wheels of the vehicle. Just as with the hydraulic system, the end result is that the amount of torque the operator must input is controlled. The amount of torque applied by the operator should not be zero. It is preferred that the operator should have to exert some input torque in order to receive tactile feedback from the steering system and to have a "feel" for the vehicle. Just as with the hydraulic system, the electric power assisted steering system uses a torsion bar located between the input shaft and the pinion shaft, whereby torque deflection between the two shafts is localized along the torsion bar and can be measured to determine the magnitude of the applied torque from the operator.

Traditionally, the torsion bar would be equipped with strain gages to determine the amount of deflection. However, systems using strain gages mounted directly to the shaft are susceptible to damage and wear. The shaft of the steering mechanism of the vehicle rotate and must be able to withstand some amount of axial movement due to the movements of the vehicle. In another known system, a mechanical shuttle converts the relative angular displacement of the input and output shafts, occurring in the torsion bar, to linear movement of a surface of the shuttle. A potentiometer, or other sensor, is mechanically linked to detect the position of the shuttle surface. These systems suffer from the problems inherent in the use of the mechanical shuttle and the contact based sensing system, namely hysteresis, reliability and sensitivity limitations. Therefore, there is a need for a device that will measure the amount of torque being transferred between the input shaft and the pinion shaft of a steering mechanism that is insulated from the rotational and axial movements of the input shaft and pinion shaft within the vehicle.

SUMMARY OF THE INVENTION

A torque sensing device adapted to measure the torque between two shafts of a steering mechanism and to send a corresponding signal to an electrical power assisted steering system of an automotive vehicle includes a housing, an input shaft rotatably supported within said housing and adapted to connect to a steering wheel of the automobile, and a pinion shaft rotatably supported within the housing and adapted to engage a steering rack of the automobile.

A torsion bar is positioned between and interconnects the input shaft and the pinion shaft and is adapted to allow rotational movement of the input shaft and the pinion shaft relative to one another. The input shaft and the pinion shaft are supported within the housing to allow limited axial movement of the input shaft and the pinion shaft within the housing. At least one magnet is fixedly mounted to one of either the input shaft or the pinion shaft.

A stator assembly having a first stator ring and a second stator ring is fixedly mounted to one of either the input shaft or the pinion shaft and extends axially over the magnet. A pair of flux brushes is fixedly supported within the housing and is located in spaced relation to one of the first and second stator rings of the stator assembly. The flux brushes are spaced apart from one another by an axial distance, thereby defining a gap therebetween. A sensing device is positioned within the gap and is adapted to measure the magnetic flux passing between the flux brushes.

Additional benefits and advantages of the present invention will become apparent to those skilled in the art to which the present invention relates from the subsequent description of the preferred embodiment and the appended claims, taken in conjunction with the accompanying drawings.

DESCRIPTION OF THE PREFERRED EMBODIMENTS

Figure 1:
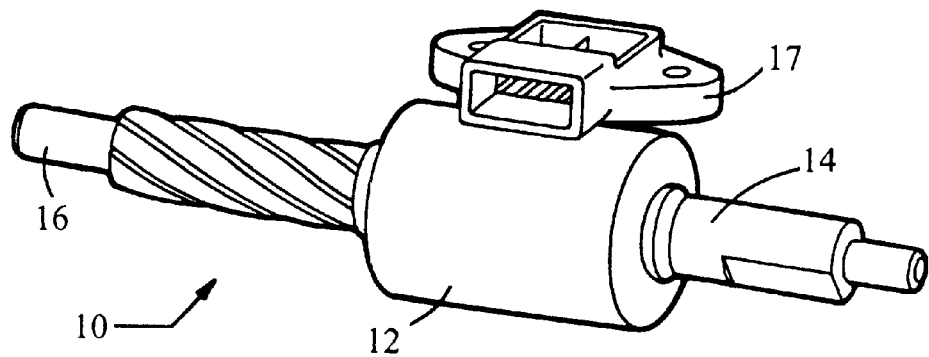
FIG. 1 is a perspective view of a torque sensing device of the present invention.

Referring to FIG. 1, a torque sensing device of the present invention is shown generally at 10. The torque sensing device 10 includes a housing 12, an input shaft 14 rotatably supported within the housing 12 adapted to connect to a steering wheel of the automobile, and a pinion shaft 16 rotatably supported within the housing 12 adapted to engage a steering rack of the automobile. A connector 17 is mounted to the housing 12 and is adapted to connect the device 10 to an electrical power assist system.

Figure 2:
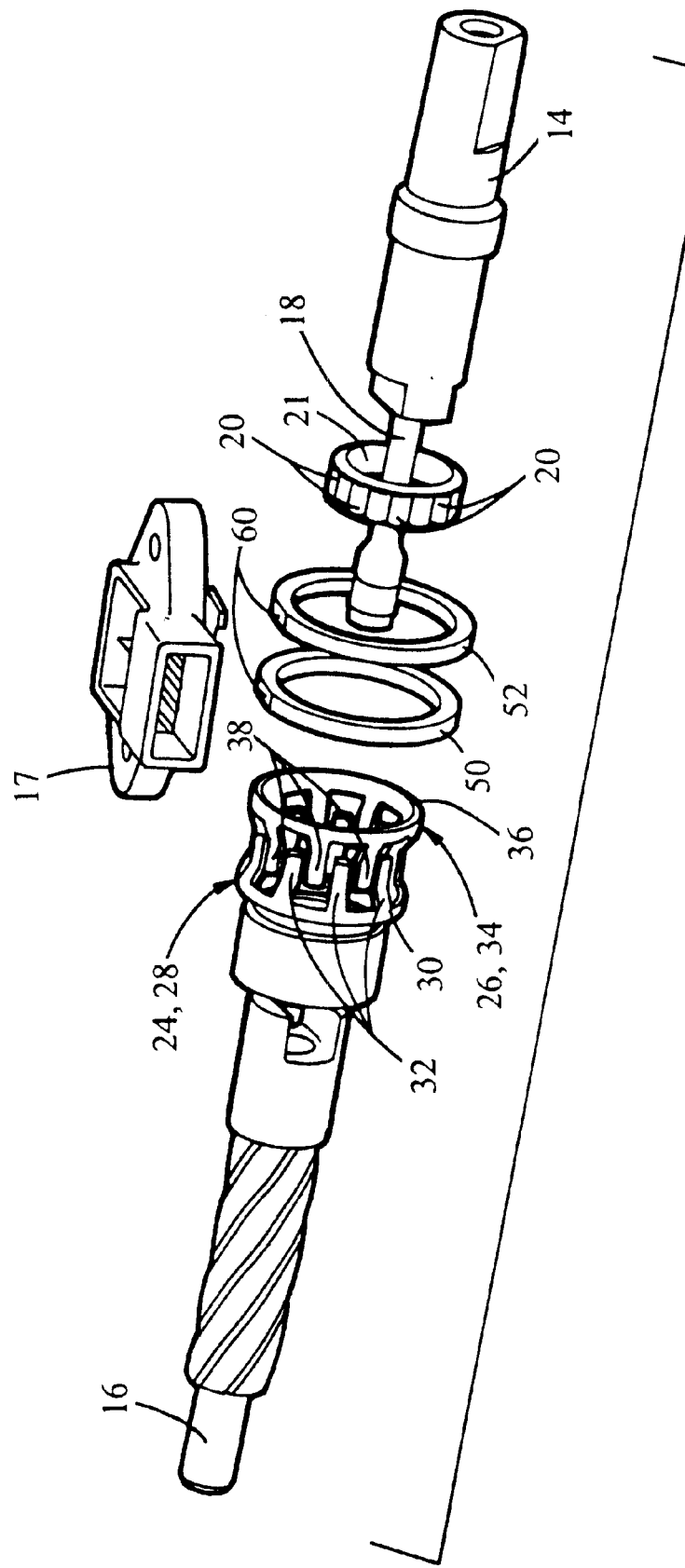
FIG. 2 is an exploded view of the torque sensing device of FIG. 1.

Referring to FIG. 2, a torsion bar 18 is positioned between and interconnects the input shaft 14 and the pinion shaft 16. The torsion bar 18 is adapted to allow rotational movement of the input shaft 14 and the pinion shaft 16 relative to one another, concentrating deflection between the input shaft 14 and the pinion shaft 16 along the torsion bar 18. As well as being rotatable within the housing 12, the input shaft 14 and the pinion shaft 16 are supported such that limited axial movement of the shafts 14,16 relative to the housing 12 is accommodated.

Figure 4:
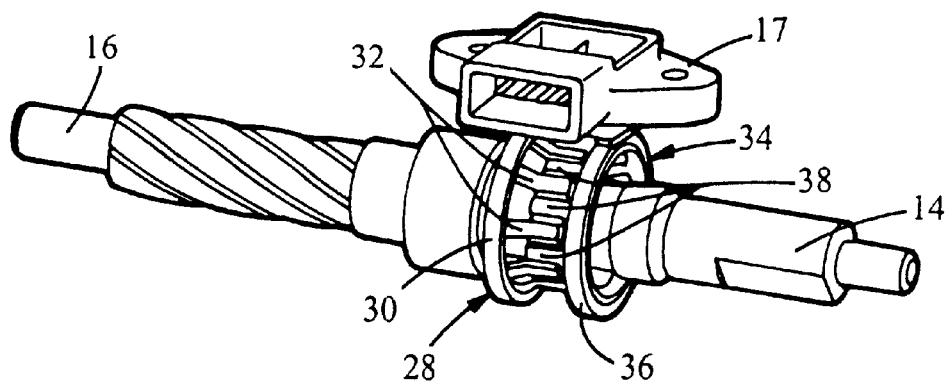
FIG. 4 is a perspective view similar to FIG. 3, shown without a stator assembly body.
Figure 5:
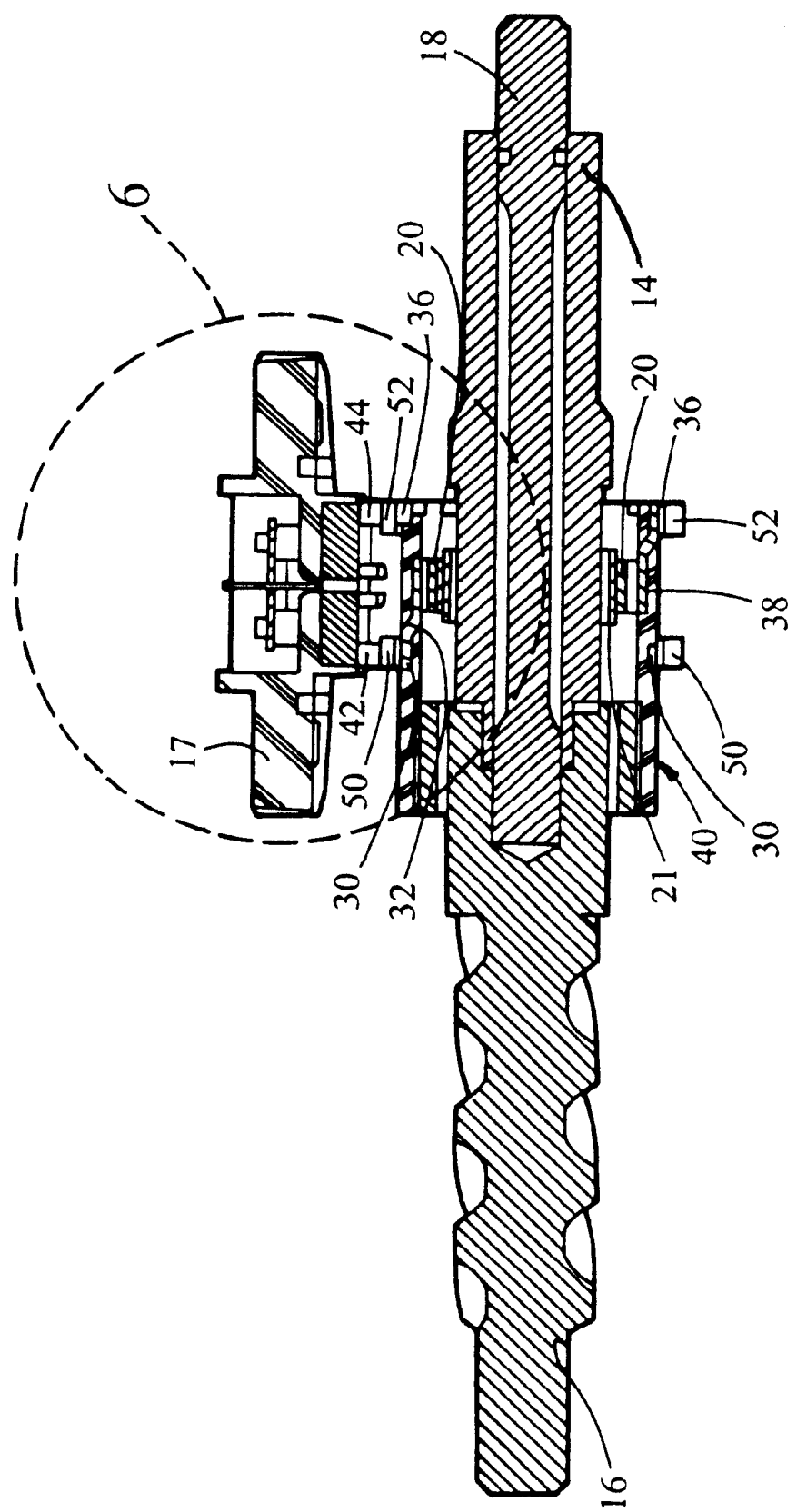
FIG. 5 is a sectional view taken along line 5—5 of FIG. 3.

At least one magnet is mounted to one of either the input shaft 14 or the pinion shaft 16. Referring to FIGS. 2 and 5, in the preferred embodiment, a plurality of magnets 20 is fixedly mounted onto a yoke 21 that is mounted onto the input shaft 14. The magnets 20 are spaced radially about the input shaft 14. A stator assembly 22 having a first pole 24 and a second pole 26 is fixedly mounted to the one of the input shaft 14 and output shaft 16 that does not have the magnets mounted thereon. In the preferred embodiment, the stator assembly is fixedly mounted onto the pinion shaft 16 and extends axially over the magnets 20. The first pole 24 of the stator assembly 22 is defined by a first stator ring 28 having an annular hub 30 with a plurality of fingers 32 extending axially from and being spaced radially about the hub 30. The second pole 26 of the stator assembly 22 is defined by a second stator ring 34 having an annular hub 36 with a plurality of fingers 38 extending axially from and being spaced radially about the hub 36. The fingers 32 of the first stator ring 28 are axially aligned and interlaced with the fingers 38 of the second stator ring 34, as shown in FIG. 4.

Figure 3:
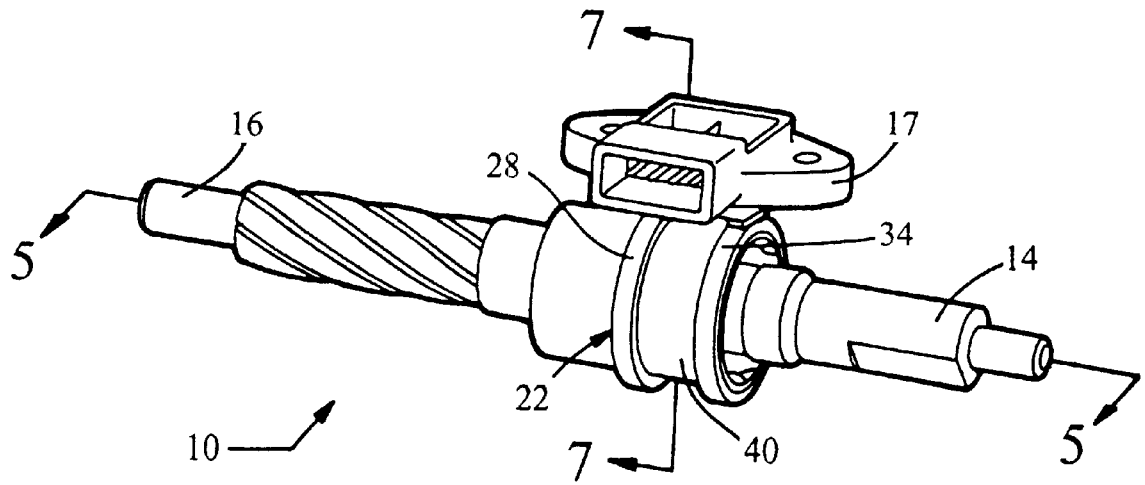
FIG. 3 is a perspective view similar to FIG. 1, shown without a housing.

Preferably, the first and second stator rings 28, 34 are supported within a stator assembly body 40 made from a non-magnetic material, as shown in FIG. 3. In the preferred embodiment, the first and second stator rings 28, 34 are molded within a plastic stator assembly body 40 wherein an outer surface of the hubs 30, 36 of the stator rings 28, 34 extend radially from said stator assembly body 40 and inner surfaces of said fingers 32, 38 are exposed inwardly from said stator assembly body 40. During steering motion, both the input shaft 14 and the pinion shaft 16 are rotatable with steering inputs from the operator. The magnets 20 and the stator assembly 22 also rotate with these steering motions.

Figure 6:
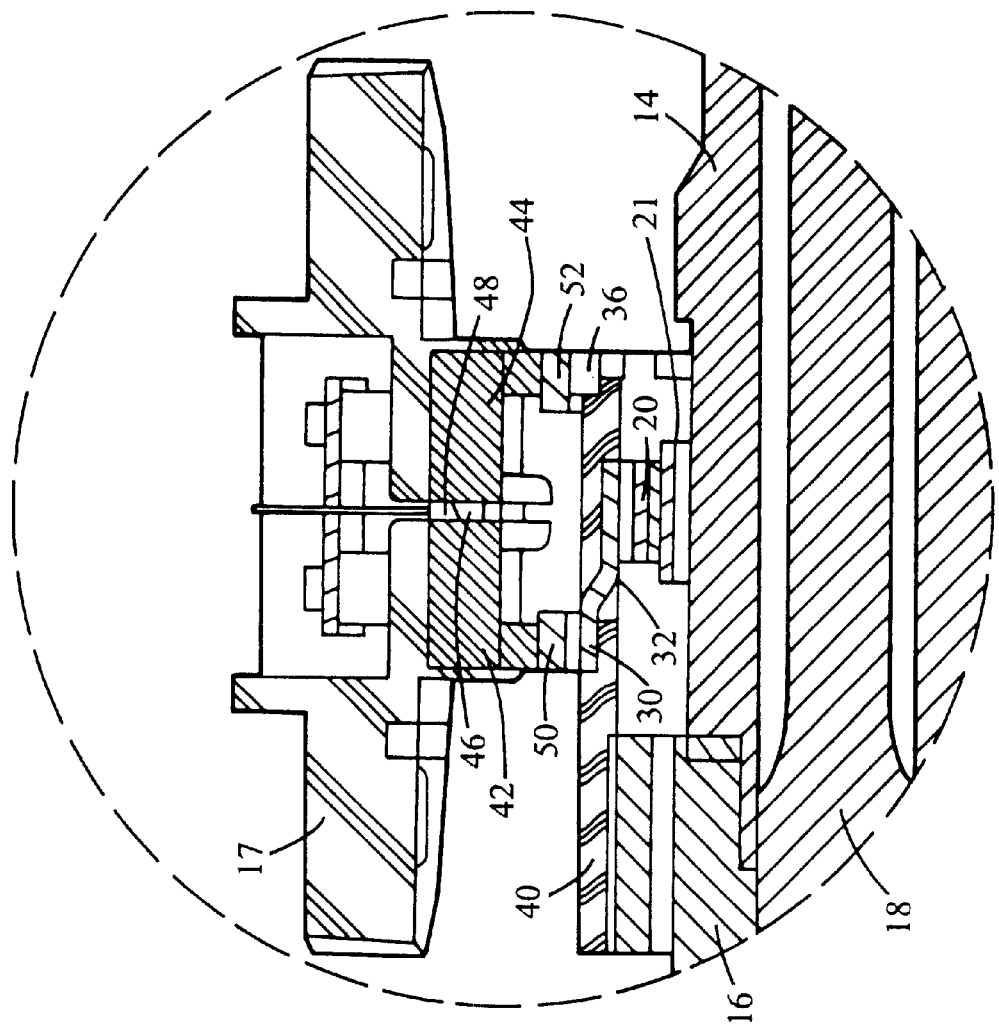
FIG. 6 is a partial sectional view of the encircled area shown in FIG. 5.

Referring to FIGS. 5 and 6, first and second flux brushes 42, 44 are supported by the connector 17. When the connector is mounted to the housing, each of the flux brushes 42, 44 is located in spaced relation to one of the first and second stator rings 28, 34 of the stator assembly 22. The flux brushes 42, 44 are mounted within the housing 12 and do not rotate with the input and pinion shafts 14, 16. The flux brushes 42, 44 are further spaced apart from one another by an axial distance defining a gap 46 therebetween, as shown in FIG. 6. A sensing device 48 is positioned within the gap 46 to measure any magnetic flux passing between the flux brushes 42, 44. Preferably, the device 48 comprises a pair of Hall effect sensors adapted to measure the direction and magnitude of magnetic flux traveling between the flux brushes 42, 44.

Figure 9:
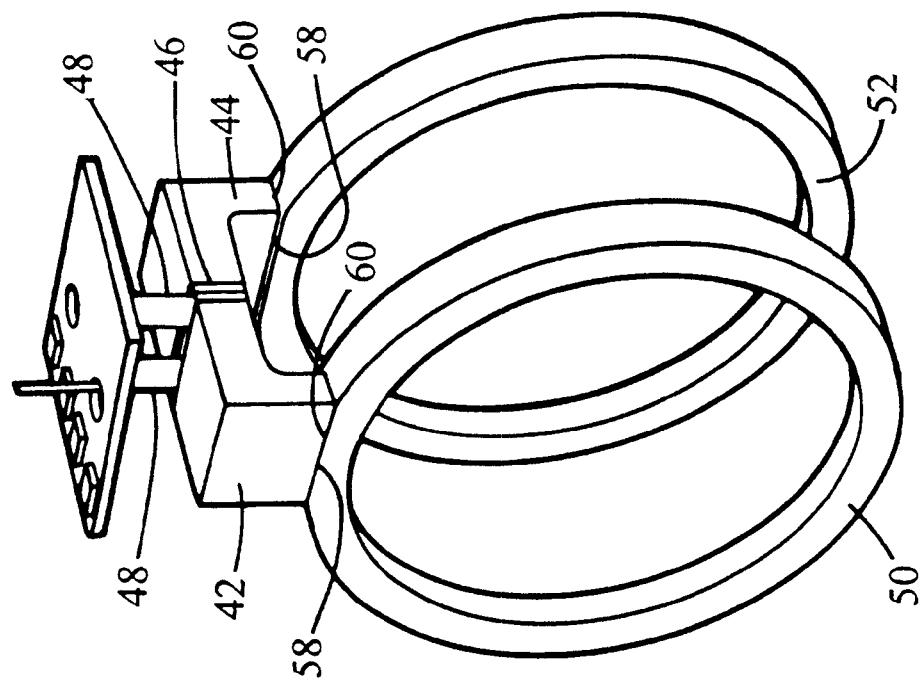
FIG. 9 is a view similar to FIG. 8 wherein the flux brushes have flat bottom surfaces adapted to engage flats formed within the flux rings.
Figure 8:
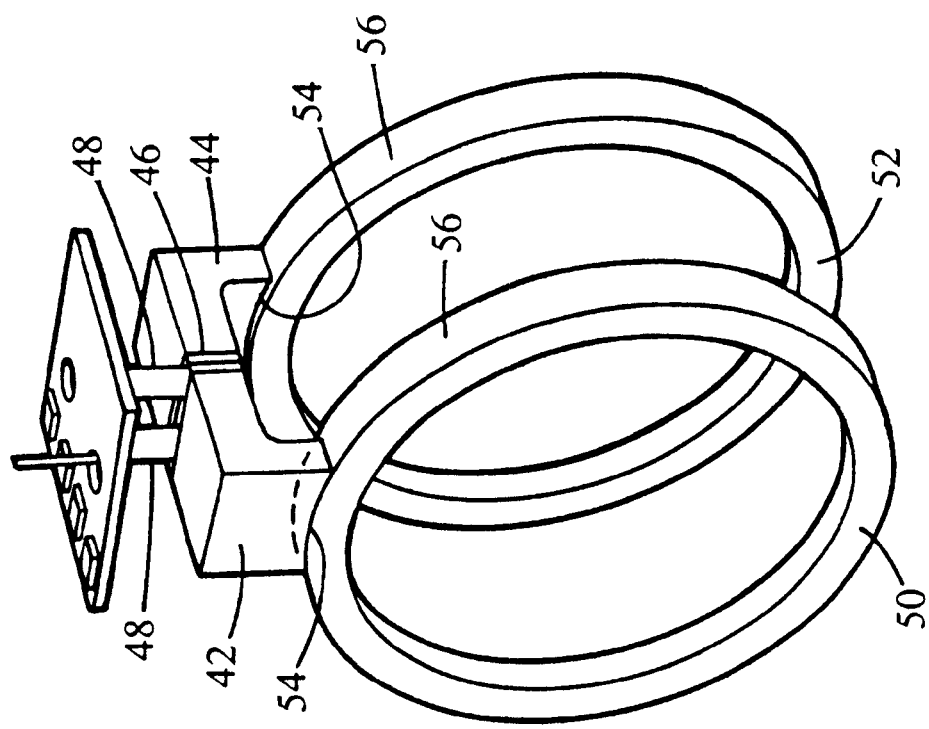
FIG. 8 is a perspective view of a pair of flux rings in engagement with a pair of flux brushes having a pair of hall effect sensors mounted between the flux brushes, wherein the flux brushes have arcuate bottom surfaces adapted to engage the flux rings.

A pair of flux rings 50, 52 are fixedly supported within the housing 12. The flux rings 50, 52 extend annularly around and are spaced from the stator assembly 22 by a radial distance. A first flux ring 50 is radially aligned with the hub 30 of the first stator ring 28 and a second flux ring 52 is radially aligned with the hub 36 of the second stator ring 34. Each of the flux brushes 42, 44 is in close proximity to one of the flux rings 50, 52. The first flux brush 42 is proximal to the first flux ring 50 and the second flux brush 44 is proximal to the second flux ring 52. The flux brushes 42, 44 can include an arcuate bottom surface 54 that is adapted to magnetically engage the arcuate outer surface 56 of the flux rings 50, 52, as shown in FIG. 8. Alternatively, the flux brushes 42, 44 can include flat bottom surfaces 58 that engage flats 60 formed within the arcuate outer surface 56 of the flux rings 50, 52, as shown in FIG. 9. Although for manufacturability considerations, it is desirable to have separate flux rings 50, 52 and flux brushes 42, 44, the concepts of the present invention would work equally as well where the first flux ring 50 and the first flux brush 42 are a single piece component and the second flux ring 52 and the second flux brush 44 are a single piece component.

The flux rings 50, 52 allow magnetic fields to travel from the stator rings 28, 34 through the flux rings 50, 52 and into the flux brushes 42, 44. Magnetic fields between the fingers 32 of the first stator ring 28 flow into the first flux brush 42 and magnetic fields between the fingers 38 of the second stator ring 34 flow into the second flux brush 44.

Figure 10:
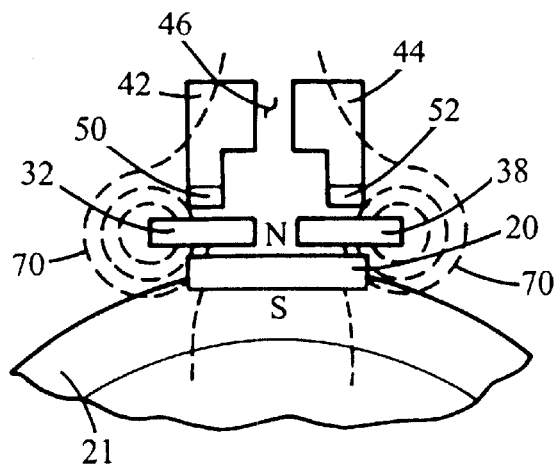
FIG. 10 is a schematic view illustrating the magnetic fields produces by a magnet in proximity with fingers of first and second poles.
Figure 11:
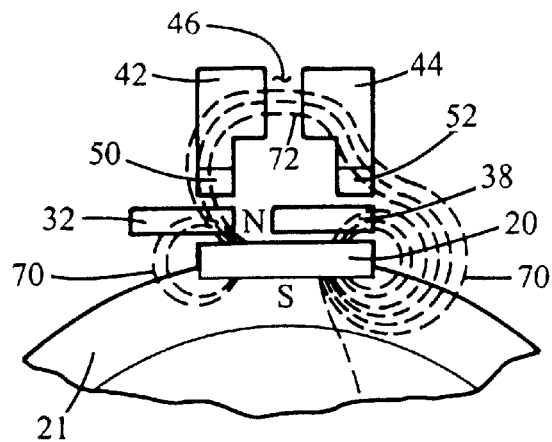
FIGS. 11 and 12 are schematic views similar to FIG. 10 illustrating the magnetic flux that is produced when the magnet is moved off center from the fingers.
Figure 12:
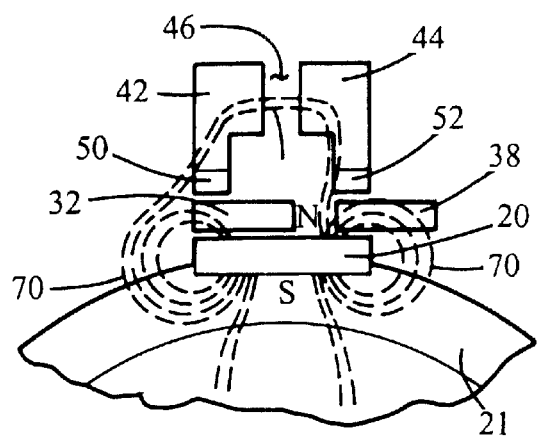

The presence of the fingers 32, 38 in proximity to the magnets 20 will cause magnetic fields to form between the fingers 32, 38 and the magnets 20. The magnet is oriented such the north end of the magnets 20 face the fingers 32, 38 of the stator assembly 22, and the south end of the magnets 20 face radially inward. The principles of operation of the magnetic fields are illustrated in schematic views of FIGS. 10, 11 and 12. FIGS. 10, 11 and 12 are simplified schematic views to show how the magnetic flux passes from the magnets 20 to the flux brushes 42, 44 and therebetween. As shown in FIG. 10, when a magnet 20 is centered between a first pole 24 and a second pole 26 having a gap 46 therebetween, magnetic fields 70 between the magnet 20 and the first and second poles 24, 26 are equal, and there is no magnetic flux traveling across the gap 46. However, when the magnet 20 is moved away from center, as shown in FIGS. 11 and 12, the magnetic field 70 in one of the poles 24, 26 is stronger than in the other pole 24, 26, thereby causing a magnetic flux 72 across the gap 46 between the two poles 24, 26. The direction of the magnetic flux 72 depends upon which way the magnet 20 is moved, and the strength of the magnetic flux 72 depends upon how far the magnet 20 is moved from center.

Since the flux rings 50, 52 and the stator rings 28, 34 do not come into physical contact, axial movement of the input shaft 14 and pinion shaft 16 relative to the housing 12 does not cause any damage or wear. The width of the hub portions 30, 36 of the stator rings 28, 34 and the width of the flux rings 50, 52 allow the hubs 30, 36 to shift back and forth relative to the flux rings 50, 52 while still maintaining close enough proximity to maintain the magnetic fields flowing therebetween.

Figure 7:
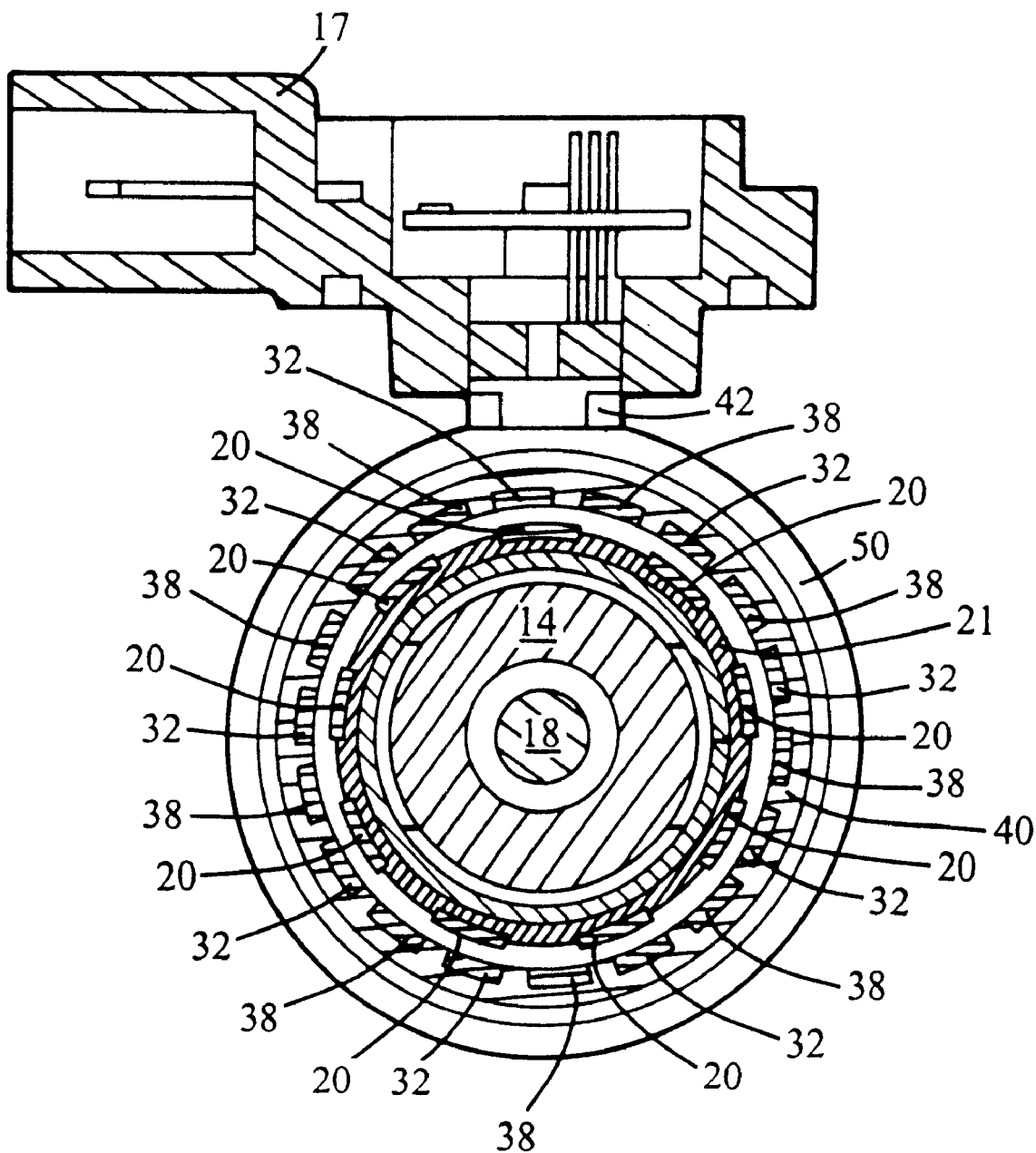
FIG. 7 is a sectional view taken along line 7—7 of FIG. 3.

When there is no torque being transmitted between the input shaft 14 and the pinion shaft 16, the magnets 20 mounted onto the input shaft 14 are centered between adjacent fingers 32, 38 of the first and second stator rings 28, 34. Therefore, when no torque is being transmitted, there is no magnetic flux traveling across the gap 46 between the first and second flux brushes 42, 44. When torque is being transmitted between the input shaft 14 and the pinion shaft 16, the torsion bar 18 will deflect to allow relative rotation between the two shafts 14, 16 and the magnets 20 mounted onto the input shaft 14 move relative to the fingers 32, 38 of the first and second stator rings 28, 34 which are mounted onto the pinion shaft 16, as shown in FIG. 7. As the magnets 20 move, the magnetic fields will become un-balanced, thereby forming a magnetic flux across the gap 46 between the first and second flux brushes 42, 44. The direction and magnitude of the flux depends upon the direction and distance of movement of the magnets 20 relative to the fingers 32, 38.

The sensors 48 mounted within the gap 46 measure the direction and magnitude of the flux traveling across the gap 46 and send a signal to the electric power assist system. The electronic power assist system will then provide power assist to move the rack of the steering mechanism proportional to the amount of magnetic flux across the gap 46 between the first and second flux brushes 42, 44.

The sensors are adapted to produce a signal in response to a magnetic field flowing through the sensor. The sensor will then produce a signal that is proportional to the current. The signal can be analog or digital. This signal is then sent to a controller that controls the electric current running through an electric motor of the electric power assist system. Therefore, as the torque between the input shaft 14 and the pinion shaft 16 increases, the magnets 20 mounted onto the input shaft will move relative to the fingers 32, 38 of the first and second stator rings 28, 34. The more the magnets 20 move, the greater the flux between the first and second flux brushes 42, 44, and the greater the signal transmitted by the sensors 48. As the signal sent to the electric motor controller increases in value, the electric motor will provide more force to assist in turning the wheels of the vehicle, thereby alleviating the amount of torque the operator must input through the steering wheel.

While the above description constitutes the preferred embodiment of the present invention, it will be appreciated that the invention is susceptible to modification, variation and change without departing from the proper scope and fair meaning of the accompanying claims.

We claim:

1. A torque sensing device adapted to measure the relative torque between two shafts and to send a corresponding signal comprising:

a housing;

an input shaft rotatably supported within said housing;

a pinion shaft rotatably supported within said housing;

a torsion bar positioned between and interconnecting said input shaft and said pinion shaft and adapted to allow rotational movement of said input shaft and said pinion shaft relative to one another, said input shaft and said pinion shaft being supported within said housing to allow limited axial movement of said input shaft and said pinion shaft within said housing;

at least one magnet fixedly mounted to one of said input shaft and said pinion shaft and a stator assembly having a first pole and a second pole fixedly mounted to the other one of said input shaft and said pinion shaft and extending axially over said at least one magnets;

a pair of flux brushes fixedly supported within said housing, each of said flux brushes being located in spaced relation to one of said first and second poles of said stator assembly, said flux brushes being spaced apart from one another by an axial distance, thereby defining a gap therebetween;

a sensing device positioned within said gap adapted to measure the magnetic flux traveling between said flux brushes, which is related to the relative position of said magnet to said stator assembly.

2. The device of claim 1, further including a pair of flux rings supported by said housing, said flux rings extending annularly around said stator assembly and being spaced from said stator assembly by a radial distance, each of said flux brushes being proximal to one of said flux rings.

3. The device of claim 2 wherein said stator assembly includes a first stator ring, defining said first pole, and a second stator ring, defining said second pole, each of said stator rings having an annular hub with a plurality of axially extending fingers spaced radially thereabout, said fingers of said stator rings being interlaced with one another.

4. The device of claim 3 further including a stator assembly body, wherein said first and second stator rings are supported within said stator assembly body.

5. The device of claim 3 wherein a first of said pair of flux rings is radially aligned with said annular hub of said first stator ring and a second of said pair of flux rings is radially aligned with said annular hub of said second stator ring.

6. The device of claim 2 wherein each of said flux brushes includes an arcuate bottom surface adapted to magnetically engage an arcuate outer surface of said flux rings.

7. The device of claim 2 wherein each of said flux brushes includes a flat bottom surface and each of said flux rings includes a flat surface formed therein adapted to magnetically engage the said surface of said flux brushes.

8. The device of claim 1 wherein said sensing device comprises a pair of hall effect sensors adapted to measure the direction and magnitude of magnetic flux passing between said flux brushes.

9. The device of claim 1 wherein a plurality of magnets are mounted to and spaced radially around one of said input shaft and said pinion shaft.

10. The device of claim 3 wherein said at least one magnets is polarized and oriented such that a north pole of said at least one magnet faces said fingers of said first and second stator rings and a south pole of said at least one magnet faces radially inward.

11. A torque sensing device adapted to measure the relative torque between two shafts and to send a corresponding signal comprising:

a housing;

an input shaft rotatably supported within said housing;

a pinion shaft rotatably supported within said housing;

a torsion bar positioned between and interconnecting said input shaft and said pinion shaft and adapted to allow rotational movement of said input shaft and said pinion shaft relative to one another, said input shaft and said pinion shaft being supported within said housing to allow limited axial movement of said input shaft and said pinion shaft within said housing;

a plurality of magnets fixedly mounted to and spaced radially about one of said input shaft and said pinion shaft;

a stator assembly having a first stator ring defining a first pole and a second stator ring defining a second pole fixedly mounted to the other of said input shaft and said pinion shaft and extending axially over said magnets, each of said first and second stator rings having an annular hub with a plurality of axially extending fingers spaced radially thereabout, said fingers of said first and second stator rings being interlaced with one another;

a pair of flux rings fixedly supported within said housing, said flux rings extending annularly around said stator assembly and being spaced from said stator assembly by a radial distance, each of said flux rings being axially aligned with said hub of one of said stator rings;

a pair of flux brushes supported by said housing, each of said flux brushes being proximal to one of said flux rings, said flux brushes being spaced apart from one another by an axial distance, thereby defining a gap therebetween;

a sensing device positioned within said gap adapted to measure the direction and magnitude of a magnetic flux passing between said flux brushes.

12. The device of claim 11 further including a stator assembly body, wherein said first and second stator rings are supported within said stator assembly body.

13. The device of claim 11 wherein each of said flux brushes includes an arcuate bottom surface adapted to magnetically engage an arcuate outer surface of said flux rings.

14. The device of claim 11 wherein each of said flux brushes includes a flat bottom surface and each of said flux rings includes a flat surface formed therein adapted to magnetically engage said flat surface of said flux brushes.

15. The device of claim 11 wherein said at least one magnets is polarized and oriented such that a north pole of said magnet faces said first and second poles and a south pole of said magnet faces radially inward.

16. The device of claim 11 wherein said sensing device comprises a pair of hall effect sensors adapted to measure the direction and magnitude of magnetic flux passing between said flux brushes.

\* \* \* \* \*